United States Patent [19]

Shima et al.

[11] 4,393,920
[45] Jul. 19, 1983

[54] MANIPULATOR FOR WORKING IN A HEAT EXCHANGER

[75] Inventors: Michitsune Shima, Kobe; Shiso Kihara, Akashi; Takeo Omichi, Kobe; Taenji Igarashi, Shiga; Kenji Mangetsu, Kameoka, all of Japan

[73] Assignees: The Kansai Electric Power Co., Inc., Osaka; Kyushu Electric Power Co., Inc., Fukuoka; Shikoku Electric Power Co., Inc., Takamatsu; Mitsubishi Jukogyo Kabushiki Kaisha, Tokyo, all of Japan

[21] Appl. No.: 235,029

[22] Filed: Feb. 17, 1981

[51] Int. Cl.³ ............................................. F28F 11/00
[52] U.S. Cl. ................................. 165/11 A; 165/76; 73/40.5 R; 73/49.8; 414/728
[58] Field of Search ...................... 165/11 A, 76; 73/40.5 R, 49.1, 49.8; 122/364; 414/728; 376/245

[56] References Cited

U.S. PATENT DOCUMENTS

| | | | |
|---|---|---|---|
| 3,934,731 | 1/1976 | Muller et al. | 165/76 X |
| 3,954,136 | 5/1976 | Gugel | 165/11 A |
| 3,964,293 | 6/1976 | Faure et al. | 165/76 X |
| 4,004,698 | 1/1977 | Gebelin | 165/76 X |
| 4,148,403 | 4/1979 | Riffe | 165/76 X |
| 4,188,167 | 2/1980 | Abell | 165/76 X |
| 4,231,419 | 11/1980 | Gugel | 165/11 A |
| 4,287,655 | 9/1981 | Gerkey et al. | 165/76 X |
| 4,302,146 | 11/1981 | Finlayson et al. | 165/76 X |

Primary Examiner—Samuel Scott
Assistant Examiner—Margaret A. Focarino
Attorney, Agent, or Firm—Wenderoth, Lind & Ponack

[57] ABSTRACT

In a vertical type heat exchanger including a water chamber delimited by a drum end plate and a header plate on which a large number of heat transfer tubes are arrayed, a novel manipulator for working in the heat exchanger is provided such that a support frame is disposed within the water chamber, a base end portion of a freely extensible and contractible main arm which is rotatable about its base end portion and vertically swingable about a fulcrum at its base end portion, is mounted on the support frame, a base end portion of a sub-arm which is rotatable about its base end portion and vertically swingable about a fulcrum at its base end portion and also which can be positioned in parallel to the header plate, is mounted at the tip end portion of the main arm, a vertically movable clamp shaft which can be inserted into the heat transfer tube is provided coaxially with the rotational axis of the sub-arm, and a position detector for detecting the position of the clamp shaft so as to assist in positioning the clamp shaft so as to become coaxial with the heat transfer tube, is provided on the clamp shaft.

7 Claims, 30 Drawing Figures

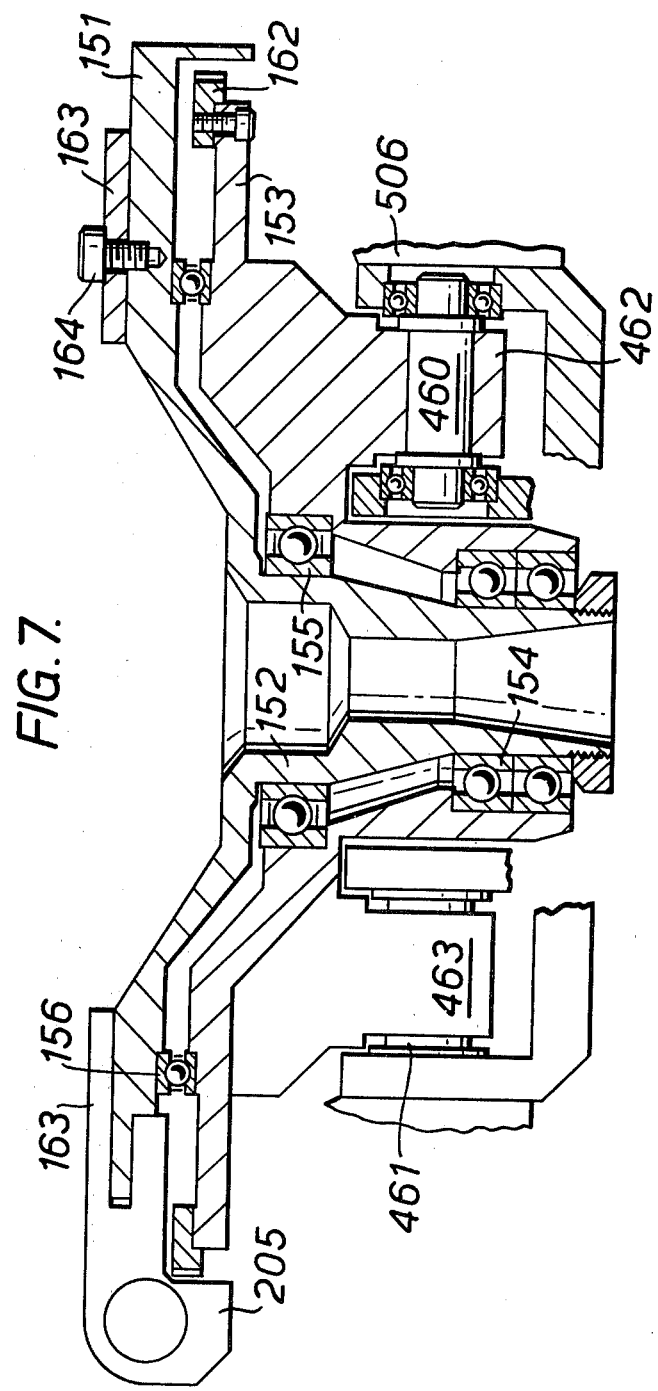

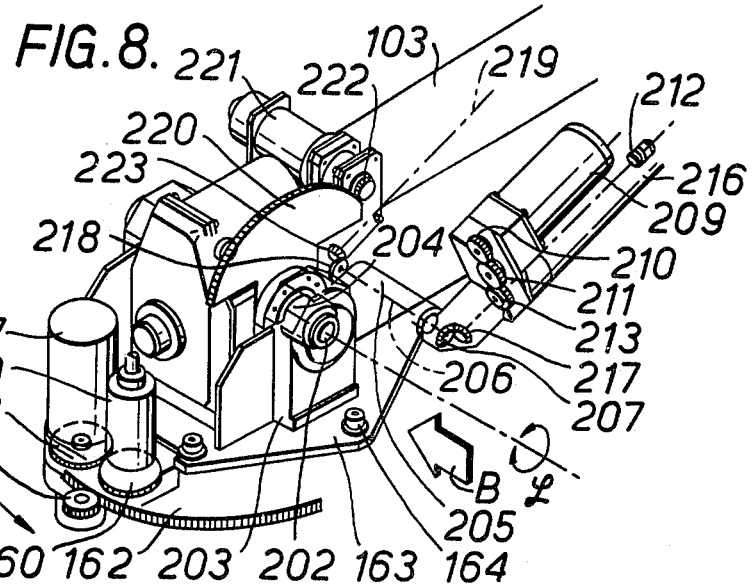
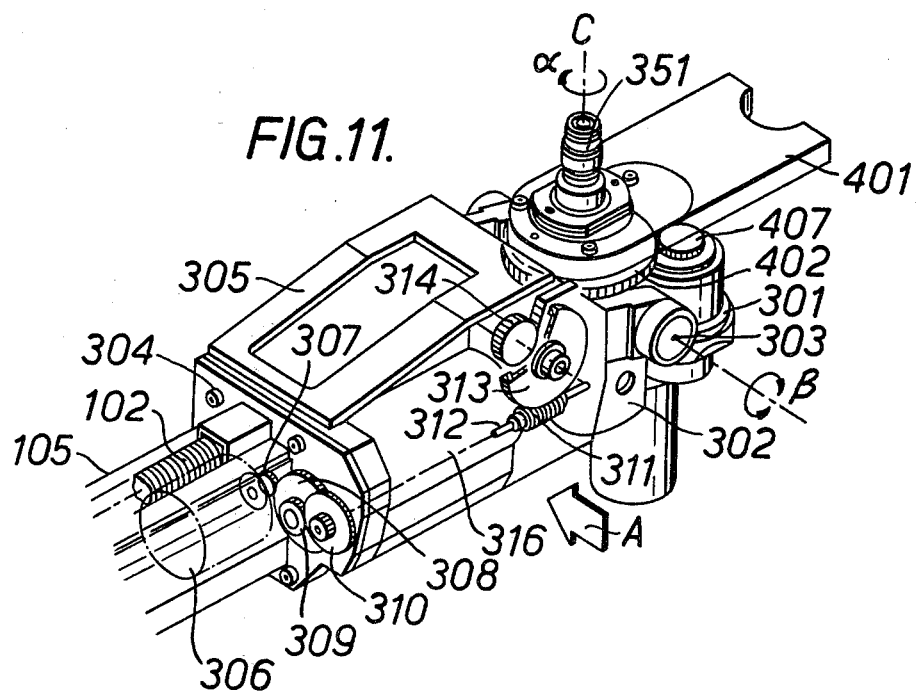

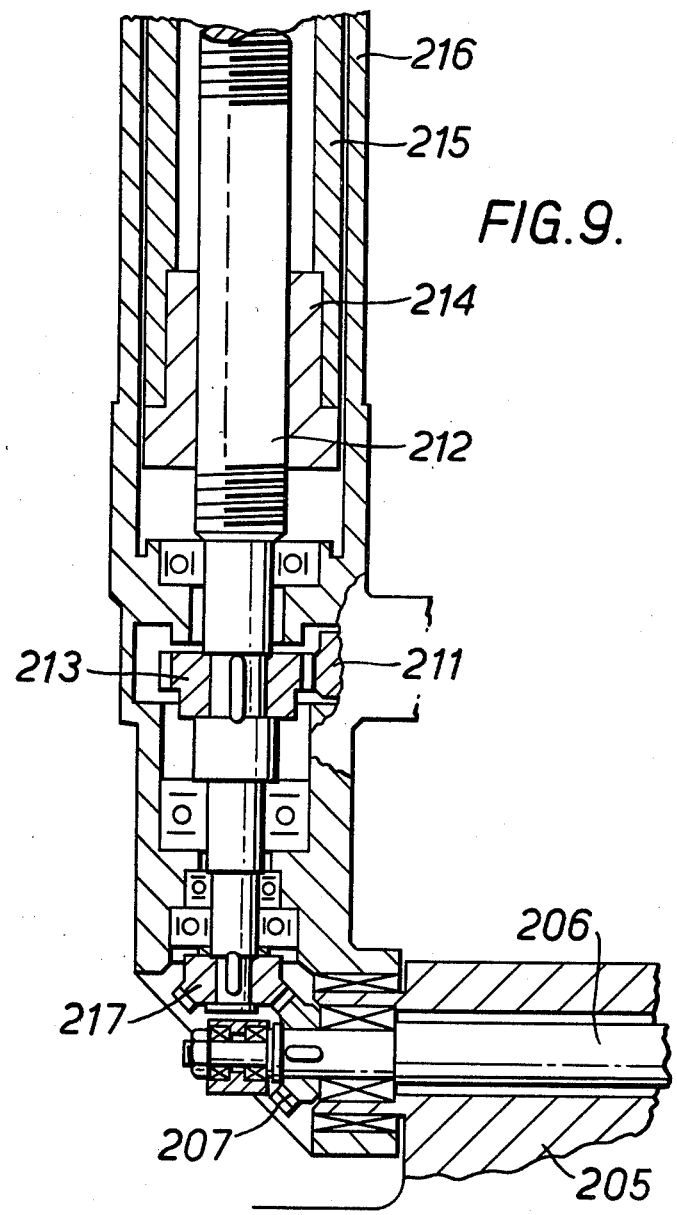

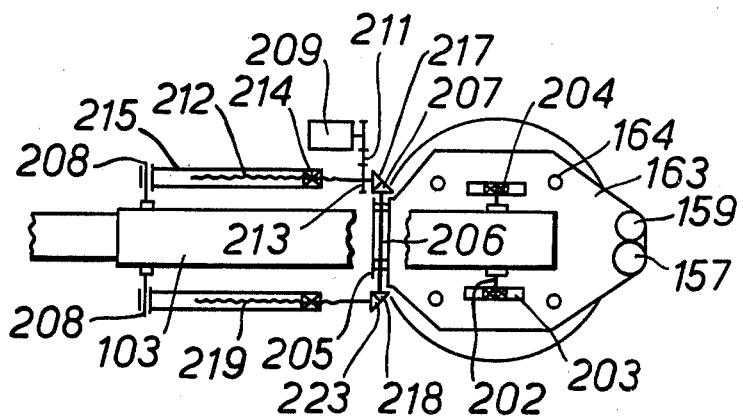
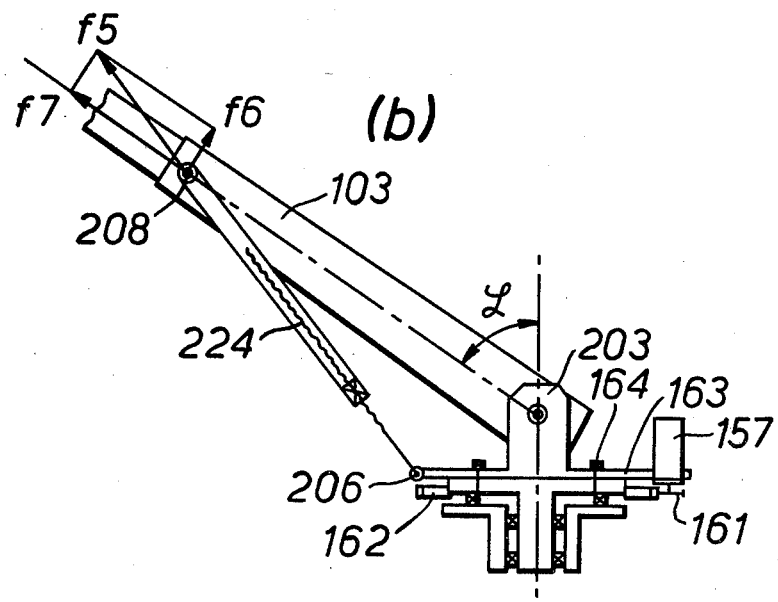
FIG. 10.

FIG. 18.
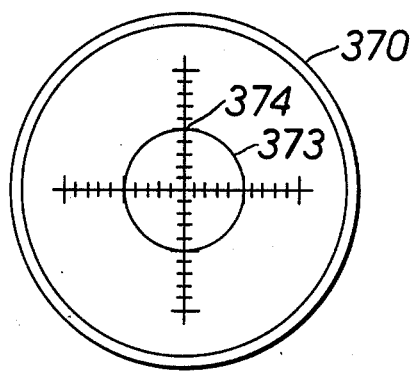
FIG. 19.
(a)
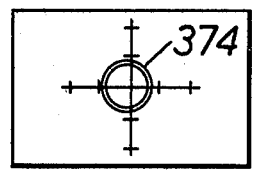
(b)
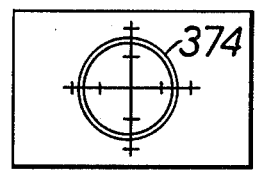
(c)
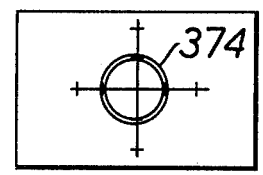
(d)
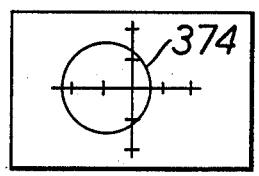
(e)
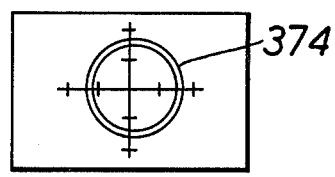

MANIPULATOR FOR WORKING IN A HEAT EXCHANGER

BACKGROUND OF THE INVENTION

The present invention relates to a manipulator for working in a heat exchanger.

Heretofore, various manipulators have been used for working or making various measurements and inspections in a dangerous circumstance or in a narrow space. For example, manipulators are used in the case of performing inspections and working while scanning a header plate surface where a large number of heat transfer tubes of a heat exchanger are arrayed. However, most of the manipulators in the prior art were of such systems where control is effected from a predetermined reference point thus, the prior art apparatus was necessarily complex because of the complexed control system, and hence, not only did it become an issue to make the apparatus light and compact, but also in its present use, it is required to work at a dangerous location or in a narrow space upon installation of the apparatus. In addition, the prior art manipulators had a disadvantge that they employed a walking type guide system, hence the weight that could be guided was limited and thus they were also restricted in working.

BRIEF SUMMARY OF THE DISCLOSURE

It is therefore one object of the present invention to provide a novel manipulator which is free from the above-described disadvantages of the prior art manipulators, and which is compact, light in weight, simple in a control system and also simple to install.

According to one feature of the present invention, there is provided a manipulator for working in a heat exchanger, constructed in such manner that a support frame is disposed within a water chamber delimited by a drum end plate and a header plate on which a large number of heat transfer tubes of a vertical type heat exchanger are arrayed, a base end portion of a freely extensible and contractible main arm is mounted on said support frame, said main arm being rotatable about said base end portion and vertically swingable about a fulcrum at said base end portion, a base end portion of a sub-arm is mounted at the tip end portion of said main arm, said sub-arm being rotatable about its base end portion and vertically swingable about a fulcrum at its base end portion, and also being capable of being positioned in parallel to said header plate, a vertically movable clamp shaft that can be inserted into said heat transfer tube is provided coaxially with the rotational axis of said sub-arm, and a position detector for detecting the position of said clamp shaft so as to assist in positioning the clamp shaft so as to become coaxial with said heat transfer tube is provided on said clamp shaft.

BRIEF DESCRIPTION OF THE DRAWINGS

The above-mentioned and other features and objects of the present invention will become more apparent by reference to the following description of a preferred embodiment of the invention taken in conjunction with the accompanying drawings, wherein:

FIG. 7 is a central cross-section view of a rotational tube ($\theta$-axis member), FIG. 8 is a perspective view of a drive section for a vertical swing cylinder ($\phi$-axis member) as indicated by arrow B in FIG. 1, FIG. 9 is a cross-section view showing a part of the drive section for the vertical swing cylinder in an enlarged scale, FIGS. 10($a$) and 10($b$) are schematic views to be used for explaining the operations of the vertical swing cylinder, FIG. 10($a$) being a plan view and FIG. 10($b$) being a front view.

FIG. 11 is a perspective view of a tip end portion of a main arm as indicated by arrow A in FIG. 1, FIG. 18 is a schematic view of a scale plate, FIGS. 19$a$–$e$ are diagrammatic views for explaining operations of a position detector.

DETAILED DESCRIPTION OF THE PREFERRED EMBODIMENT

Figure 1:
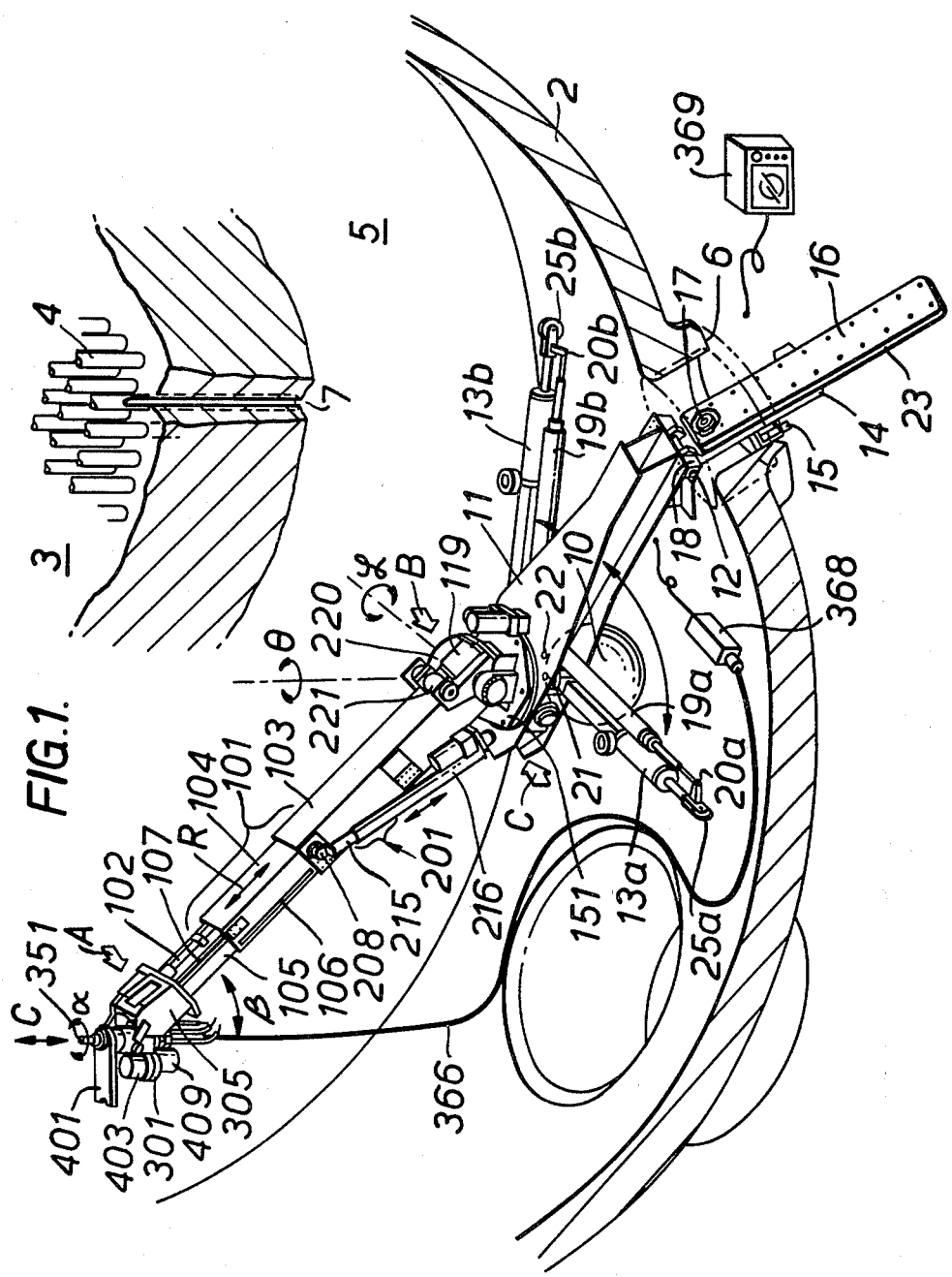
FIG. 1 is a perspective view showing the external appearance of a manipulator for working in a heat exchanger according to the present invention as disposed within a water chamber of a heat exchanger.

Referring now to FIG. 1, the external appearance of a manipulator according to the present invention, which is operable within a water chamber delimited by a lower end header plate 3 on which vertically directed heat transfer tubes 4 of a heat exchanger are arrayed and a hemispherical drum end plate is illustrated in a perspective view covering the header plate.

Figure 2:
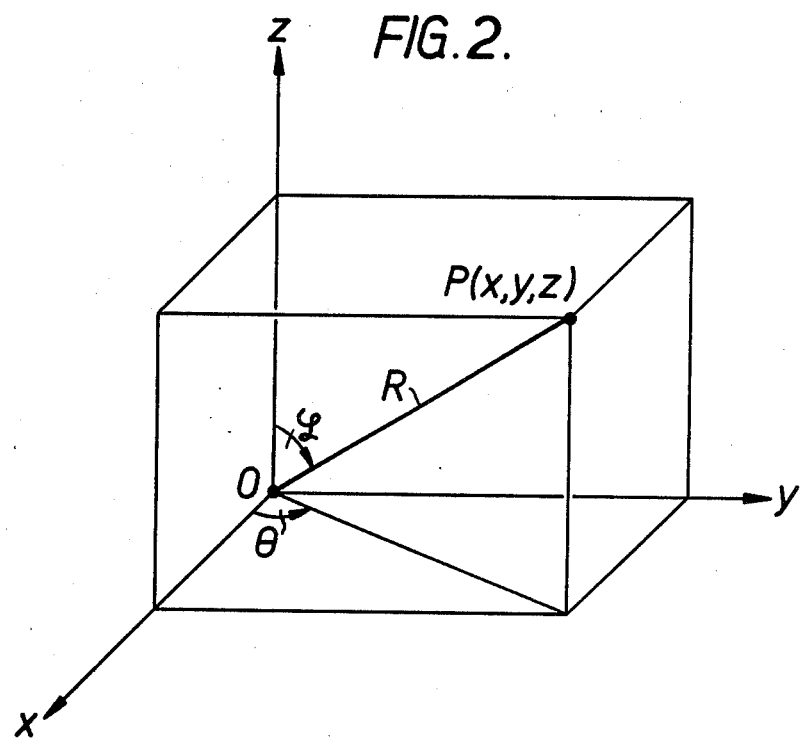
FIG. 2 is a diagrammatic view showing the relation between the polar coordinates and the rectangular coordinates.
Figure 3:
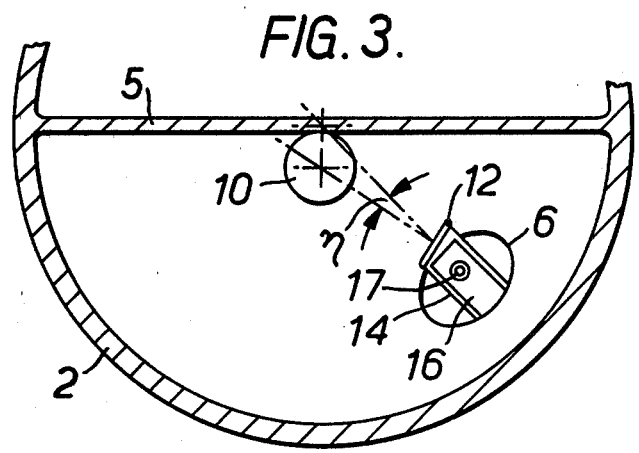
FIG. 3 is a schematic view showing a difference between the set directions of a fixed table and a fixed pin.

At first, generally explaining the construction of the entire apparatus according to the present invention, a support frame 11 having one end supported by a ball 10 disposed at the bottom of a water chamber 2 and the other end supported by engaging a hook 18 with a fixed pin 12 provided in a manhole 6, is fixed within the water chamber 2 by means of a pair of laterally openable support arms 13a and 13b, and various mechanisms for performing scanning according to polar coordinates (R, $\theta$, $\phi$) as shown in FIG. 2 with reference to this support frame 11, are provided. These mechanisms are formed of a turntable ($\theta$-axis) 151 ($\theta$-axis member) that can be rotated about a $\theta$ axis along a horizontal plane on the support frame 11, a main arm (R-axis member) 101 freely extensible and contractible along an R-axis, provided on the turn table 151, and a horizontal shaft ($\phi$-axis member), extending along a $\phi$ axis about which the main arm 101 is vertically swung, a sub-arm 401 is provided at the tip end of the main arm 101, and this sub-arm 401 is also provided with a rotational shaft ($\alpha$-axis member) extending along an $\alpha$-axis, a vertical swing shaft, ($\beta$-axis member) extending along a $\beta$-axis and a clamp shaft 351 (C-axis member) which is vertically along a C-axis movable with respect to the sub-arm 401. In addition, there are provided rocking shafts ($\kappa$-axis $\lambda$-axis members) which are orthogonal to each other for the purpose of adjusting the reference turntable 151 so as to become parallel to the scanning surface (header plate 3). Upon working, a necessary tool or inspection device is mounted at the tip end of the sub-arm 401 to be scanned through any arbitrary position.

In the following, description will be made of a fixing mechanism for the above-described support frame serving as a reference plane, the R-, $\theta$- and $\phi$-coordinate axes of the polar coordinates (R, $\theta$, $\phi$), the $\alpha$-, $\beta$- and C-axes, and further the $\kappa$- and $\lambda$-axes, respectively.

Figure 4:
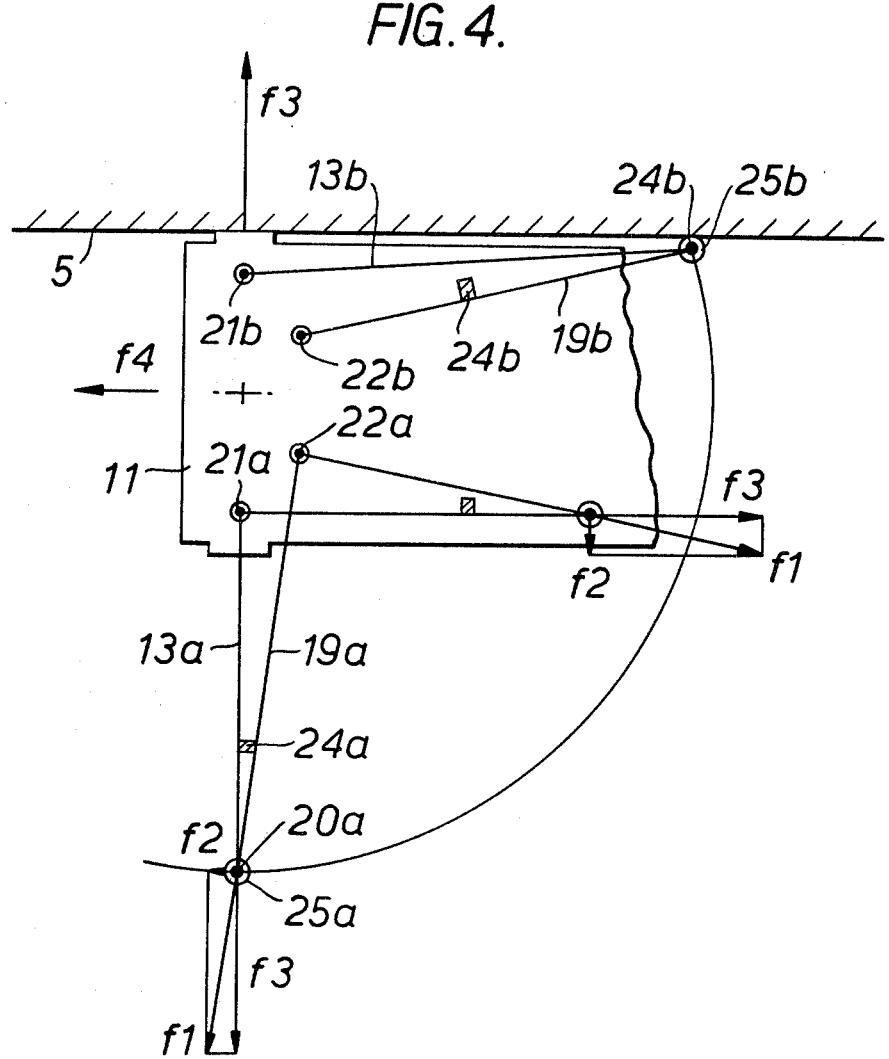
FIG. 4 is a diagrammatic view to be used for explaining the operations upon disposing a support frame within a water chamber.

At first, the fixing mechanisms for fixing the support frame 11 and the fixed table 14 which serve as reference members for the scanning, will be explained. One end of the support frame 11 is fixed relative to the fixed table 14 which is inserted into a manhole 6 and has its tip end portion fixed to the manhole 6 by means of a bolt 15, by engaging a hook 18 provided at one end of the support frame 11 with a fixed pin 12 provided at the tip end of the fixed table 14, and the other end of the support frame 11 is placed on a ball 10. Then, the aforementioned fixed pin 12 is disposed to right angles (corrected by an angle $\eta$) to the direction directed to the center of the water chamber 2, so that upon inserting the support frame 11 into the water chamber 2 as will be described later, the support frame 11 may not interfere with a partition wall 5. In addition, in order to facilitate insertion of the support frame 11, an insert assistant table 16 is rotatably mounted at the tip end portion of the fixed table 14 by means of a pin 17, and guide grooves 23 are provided on the side surfaces of the insert assistant table 16, so that the support frame 11 can be inserted while sliding guide rails (not shown) of the support frame 11 along the guide grooves 23. After the support frame 11 has been inserted with one end thereof placed on the ball 10 and the other end engaged via the hook 18 with the fixed pin 12, in order to further fix the support frame 11, laterally openable support arms 13a and 13b are mounted on the left and right sides of the support frame 11 via pins 21a and 21b, respectively, support rollers 25a and 25b are provided at the other ends of the support arms 13a and 13b, and opening/closing cylinders 19a and 19b for opening and closing these support arms 13a and 13b each have one end pivotably mounted on the support frame 11 via pins 22a and 22b, respectively, and the other ends pivotably mounted at the tip ends of the support arms 13a and 13b via pins 20a and 20b, respectively. Accordingly, upon fixing the support frame 11, at first the support arm 13a is opened by extending the opening/closing cylinder 19a as shown in FIG. 4. Then, since an extension force $f_1$ of the opening/closing cylinder 19a produces a component force $f_2$, the support arm 13a would rotate in the clockwise direction jointly with the opening/closing cylinder 19a coupled via the pin 20a. As the opening/closing cylinder 19a extends further, when it has rotated by a given angle, the support arm 13a becomes restricted in rotation by a stopper 24a provided on the opening/closing cylinder 19a, so that only extension of the support arm 13a is effected, eventually the support roller 25a butts against the outer wall of the water chamber 2 and is fixed there, and at the same time the support frame 11 is moved towards the partition wall 5 by a reaction force for the extension force component $f_3$ of the opening/closing cylinder 19a, so that the side surface of the support frame 11 butts against the partition wall 5 and, due to a frictional force along the butt surface the support frame 11, can be fixed also in the direction perpendicular to the sheet of FIG. 4. Subsequently, fixing of the support frame 11 can be effected by extending the other opening/closing cylinder 19b in a similar manner as the above-mentioned, but in this case the support arm 13b butts against the partition wall 5 before the stopper 24b butts against the support arm 13b, and hence the function of the stopper is achieved by the partition wall 5. Although a component force $f_4$ which tends to move the support frame 11 leftwards as viewed in FIG. 4 is generated as a result of the above-described operations of the support arms 13 and the opening/closing cylinders 19, this component force $f_4$ is balanced with a constraining force exerted upon the support frame 11 by the aforementioned fixed pin 12, and hence it is little worth consideration. As described above, the support frame 11 can be firmly fixed within the hemispherical water chamber 2 by means of the fixed pin 12, hook 18, support arms 13, support rollers 25 and ball 10.

Figure 5:
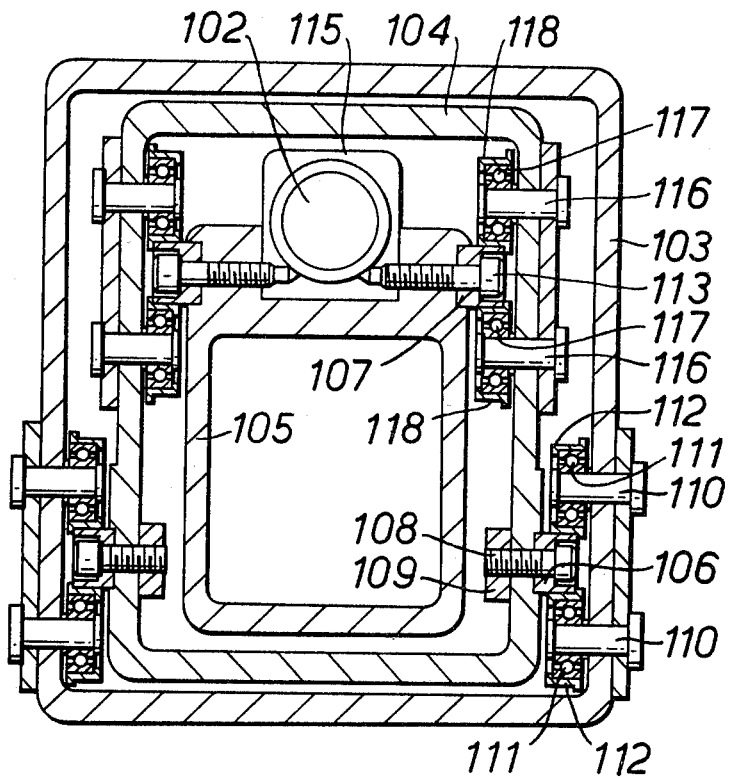
FIG. 5 is a transverse cross-section view of a main arm (R-axis)
Figure 6:
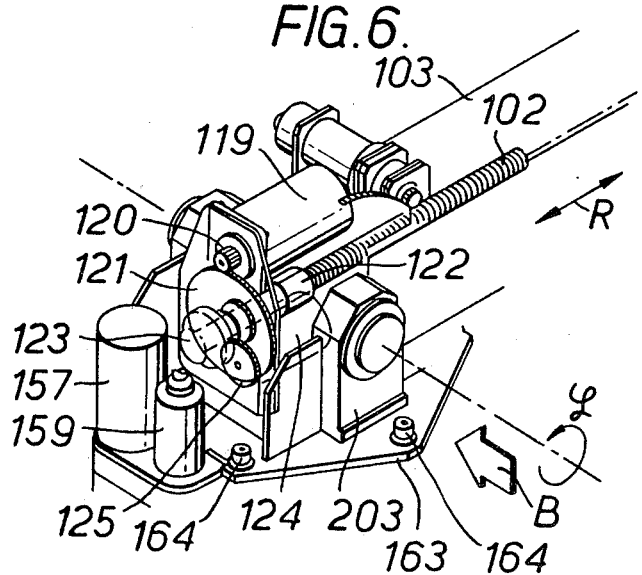
FIG. 6 is a perspective view of a drive section for a main arm as indicated by arrow B in FIG. 1.

Next, description will be made successively of an R-axis member, $\theta$-axis member and $\phi$-axis member which move according to the polar coordinates (R, $\theta$, $\phi$) established on the support frame 11. An R-axis member, that is, a main arm 101 includes a mechanism for converting normal and reverse rotations of a ball screw 102 into back and forth movements, and has a freely extensible and contractible double telescopic structure consisting of an outer shaft ($R_1$-axis member) 103 for holding a middle shaft ($R_2$-axis member) 104 and an inner shaft ($R_3$-axis) 105, and the main arm 101 is provided on a $\theta$-axis member, that is, a turntable 151 as will be described later, as shown in FIGS. 1 and 5. As shown in detail in FIG. 5, $R_1$-axis member 103, $R_2$-axis member 104 and $R_3$-axis member 105 are held in a mutually slidable manner via guide rails 106 and 107 provided on the $R_2$-axis member 104, $R_3$-axis member 105 and hold bearings 112 and 118. The guide rails 106 are fixed on the $R_2$-axis member 104 by means of bolts 108 and nut plates 109, and the hold bearings 112 are supported by support pins 110 fixed on the $R_1$-axis member 103. Likewise, the guide rails 107 are fixed on the $R_3$-axis member 105 by means of bolts 113 and a hold frame 115 for the ball screw 102, and are slidably held by support pins 116 fixed on the $R_2$-axis member 104 via bearings 117 and rollers 118. In order to drive this R-axis member 101, as shown in FIG. 6, a pinion 120 coupled to an R-axis drive motor 119 intermeshes with a gear 121 fixed to the ball screw 102. A ball nut 122 fixed to the $R_3$-axis member 105 (not shown in FIG. 6) is engaged with this ball screw 102, and thereby a rotational motion can be converted into a reciprocating motion. In addition, as a detector means for detecting the amount of extension and contraction of the R-axis member 101, there is provided a detecting gear 123 fixed to the ball screw 102, which gear intermeshes with a gear 125 fixed to an encoder 124 at an appropriate gear ratio, and hence, the amount of extension and contraction of the R-axis member 101 can be detected on the basis of an amount of rotation of the ball screw 102. It is to be noted that upon the extension and contraction operations, since the amount of extension of the $R_2$-axis member 104 and the $R_3$-axis member 105 are restricted by restriction stoppers (not shown), the extensions and contractions of the respective axis members are effected at an appropriate proportion.

Figure 20:
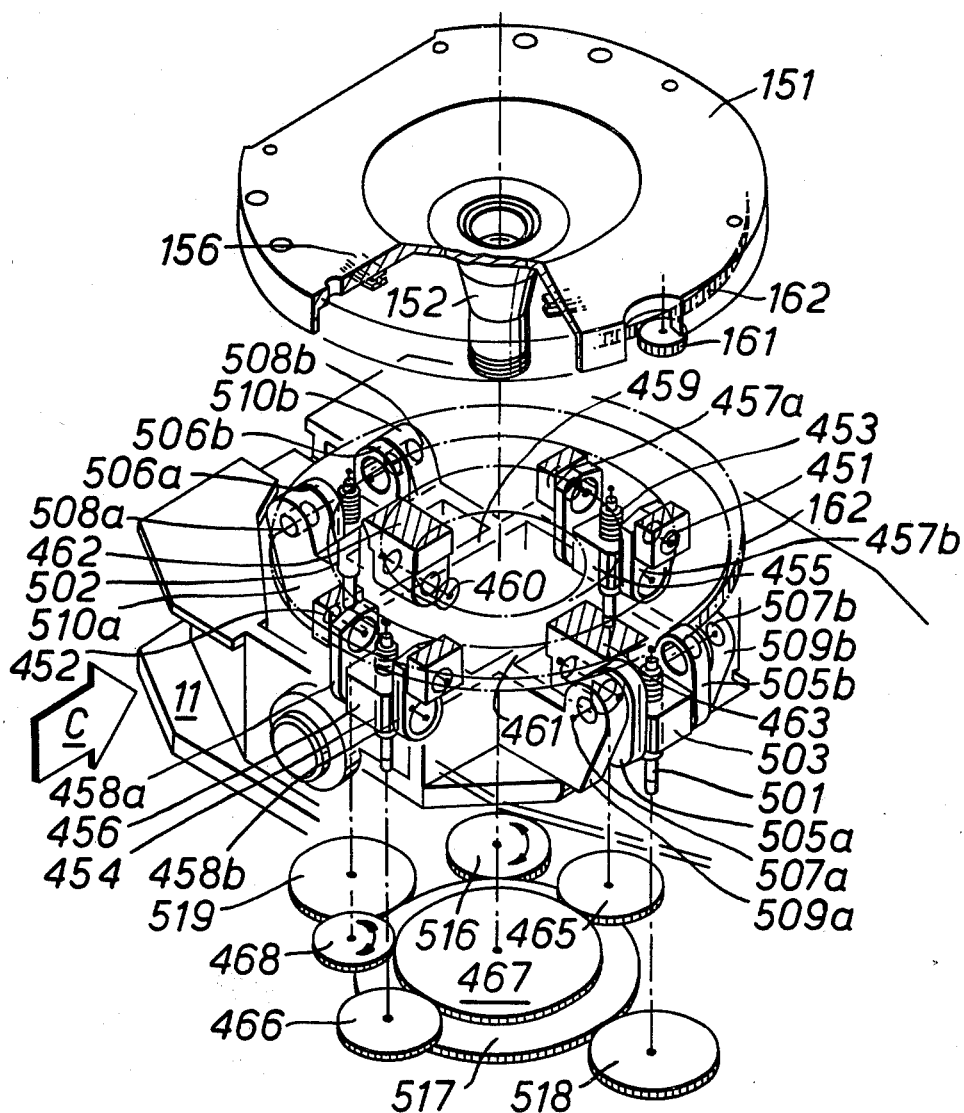
FIG. 20 is a perspective view for explaining assembly of rocking mechanisms (the $\kappa$-axis member and the $\lambda$-axis member).
Figure 21:
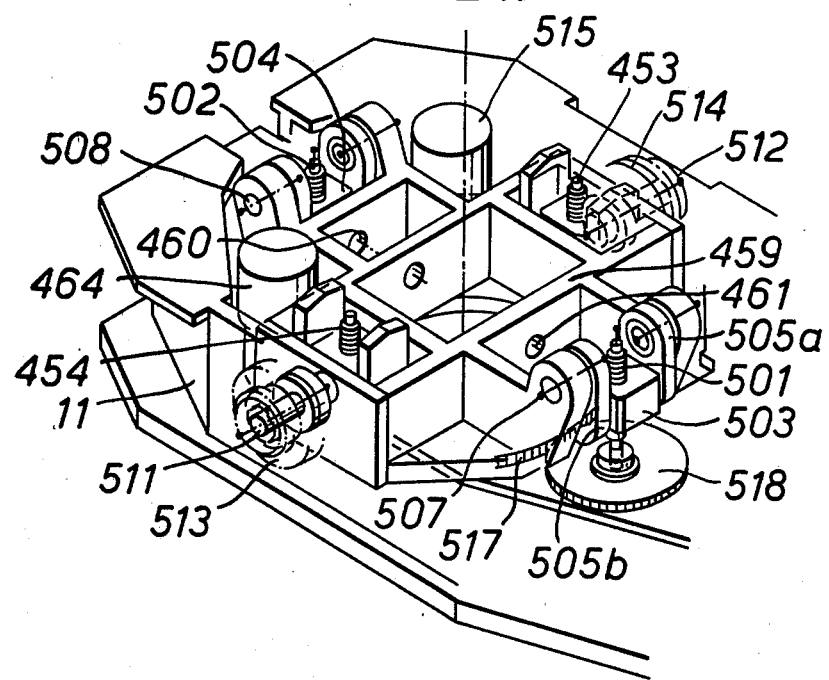
FIG. 21 is a perspective view of an external appearance of a $\kappa$-axis holding frame on a support frame.

As shown in FIG. 7, on a $\theta$-axis member, that is, on a turn table 151 that is rotatable in a horizontal plane, is provided a downwardly projecting cylindrical rotary tube 152 at its central portion, and the turntable 151 and the rotary tube 152 are rotatably supported by ball bearings 154 and 155 and a thrust bearing 156 provided on a fixed gear table 153 which is coupled to a $\kappa$-axis hold frame 459 forming one of two parallelism adjustment mechanisms for the turntable 151 as will be described later, via its links 457 and 458 (See FIGS. 20 and 21). In addition, a joint frame 163 provided on the upper surface of the turntable 151 is fixed by bolts 164, and so, the joint frame 163 can be separated from the turntable 151 by disengaging these bolts 164. With regard to a drive section for this turntable 151, as shown in FIG. 8, a pinion 158 and a drive pinion 161 are fixed to a $\theta$-axis drive motor 157 which is fixed on the turntable 151, and the drive pinion 161 intermeshes with a fixed gear 162 that is fixedly secured on the fixed gear table 153. Detection of the amount of rotation is effected by the pinion 158 intermeshing with a gear 160 of an encoder 159 provided on the turntable 151. Upon operation of the $\theta$-axis member, the $\theta$-axis drive motor 157 rotates and its torque is transmitted via the drive pinion 161 to the fixed gear 162 on the fixed gear table 153, so that the $\theta$-axis drive motor 157 is rotated jointly with the turn table 151 by a reaction torque then generated. In addition, by separating the joint frame 163, the above-described R-axis member and $\theta$-axis member and the later described $\phi$-axis member, $\alpha$-axis member and $\beta$-axis member can be divided. The amount of rotation can be known by means of the encoder 159.

Now description will be made of the $\phi$-axis member, that is, of the vertical swing shaft. This $\phi$-axis member achieves vertical swinging of the above-described main arm (R-axis) 101 (R-axis member). As shown in FIG. 8, a pivot pin 202 provided at the base end of the $R_1$-axis member 103 is rotatably supported by bearings 204 held on a bearing hold frame 203 that is fixed on the turntable 151. Referring to FIGS. 1, 9, 10(a), and 10(b), on both sides of the R-axis member 101 are disposed a pair of vertical swing cylinders 201 each cylinder has one end pivotably mounted at the upper portion of the $R_1$-axis member via pins 208a and 208b, and at the other end a ball screw 212 intermeshes with a ball nut 214 fixed to an inner cylinder 215 of the vertical swing cylinder 201. To the tip end of the ball screw 212 is fixedly secured a bevel gear 217. In addition, bevel gears 207 and 218 are provided at the opposite ends of a rotary shaft 206 supported by a bearing holder 205 which is provided at one end portion of the joint frame 163, and this bevel gear 207 intermeshes with the aforementioned bevel gear 217. In a drive section for this vertical swing cylinder 201, as shown in FIG. 8 and in FIG. 9 which shows a part of the structure in FIG. 8 in an enlarged scale as extracted therefrom, on the ball screw 212 is provided a rotary gear 213, a $\phi$-axis drive motor 209 is provided on an outer cylinder 216 of the vertical swing cylinder 201, a drive gear 210 is provided at the tip end of this $\phi$-axis drive motor 209, and this drive gear 210 intermeshes with the rotary gear 213 on the above-mentioned ball screw 212 via an idler gear 211. In addition, the bevel gear 218 of the other vertical swing cylinder 201 is also driven in a similar manner, and thereby smooth vertical swinging is made possible. Detection of the amount of vertical swing is effected by a detection gear 220 fixed to a rotational pin 202 at one end of the R-axis member 101 intermeshing with a detection gear 222 of an encoder 221. Upon operation of this $\phi$-axis member, as shown in FIGS. 8 and 10(a), the torque of the $\phi$-axis drive motor 209 is transmitted via the idler gear 211 and rotary gear 213 to the ball screw 212. At the same time, a torque is transmitted to a ball screw 219 located at a symmetric position to the ball screw 212 through the path from the bevel gear 217 to the bevel gear 207 to the bevel gear 218 of the rotary shaft 206 to the bevel gear 223, and hence the ball screw 219 is rotated by the same amount as the ball screw 212. Then, a drive force $f_5$ as shown in FIG. 10(b) is generated at the pin-joint portion of the R-axis member 101, and since the $R_1$-axis member 103 is held by the bearings 204 at the position of the pivot pin 202, a component force $f_6$ of the drive force $f_5$ acts as a torque to make the R-axis member 101 vertically swing about the pivot pin 202 by the corresponding amount.

Figure 12:
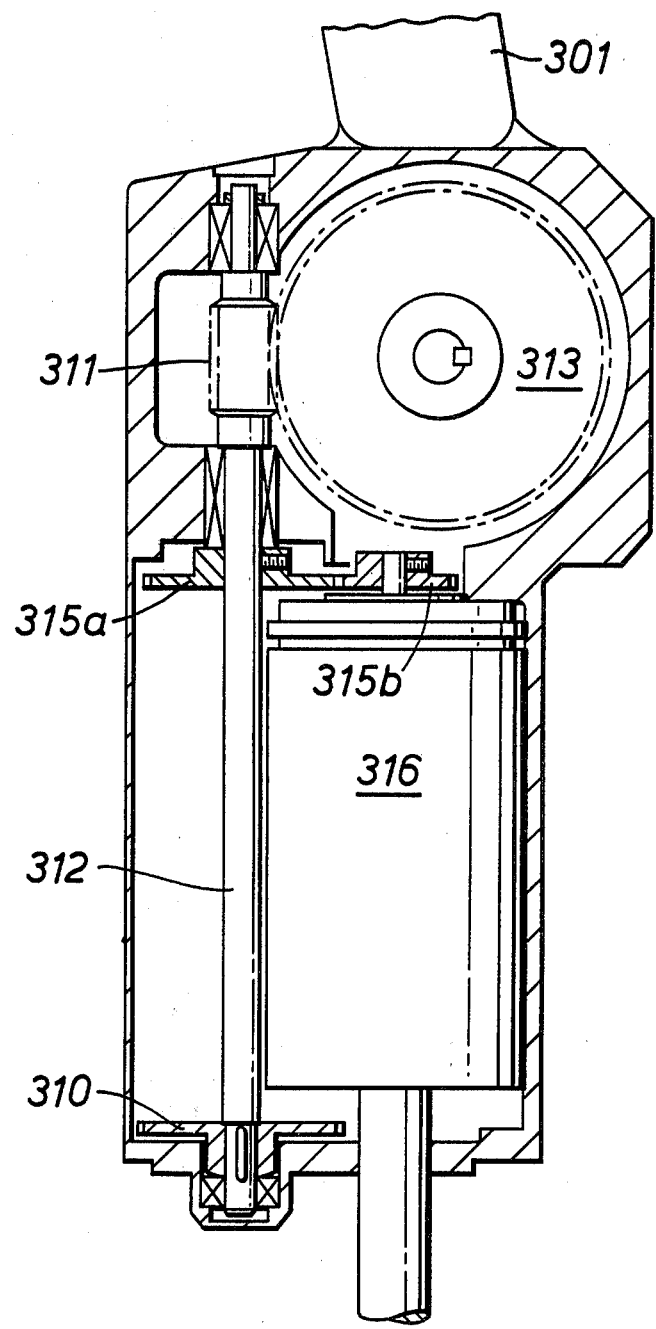
FIG. 12 is an extracted and enlarged cross-section view of a vertical swing mechanism ($\beta$-axis member) of a sub-arm and its detector section.
Figure 13:
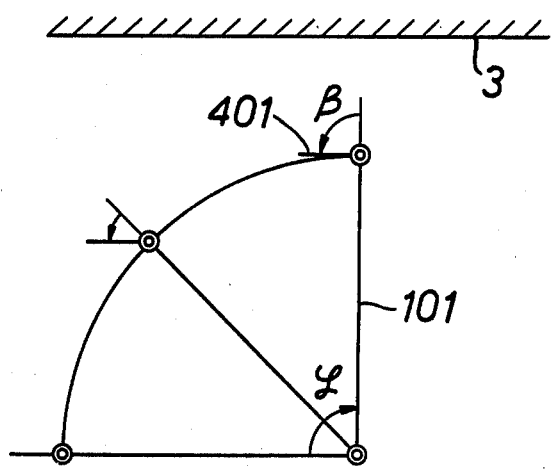
FIG. 13 is a diagrammatic view for explaining a relation between a main arm and a vertically swung sub-arm.

As explained above, the R-axis member, $\theta$-axis member and $\phi$-axis member are provided at the base end portion of the main arm, and they jointly achieve scanning of the tip end portion of the main arm 101 through any arbitrary scanning points by their respective extension/contraction, rotation and vertical swing. At the tip end portion of the main arm 101 is provided a sub-arm 401 for mounting a tool or the like, and various workings can be achieved by means of the tool or the like mounted at the tip end portion. In this sub-arm 401 are also provided a $\beta$-axis member, an $\alpha$-axis member and a C-axis member for the purpose of enlargement of a scope of scanning, adjustment of an attitude upon scanning, holding of a load, etc. At first, description will be made of a $\beta$-axis member. As shown in FIG. 11, at the tip end portion of the R-axis member 101 is provided a $\beta$-axis member, that is, an auxiliary vertical swing shaft for the purpose of correcting the attitude of the sub-arm 401. In order to support this $\beta$-axis member, a $\beta$-axis frame 305 is fixedly secured to the $R_3$-axis member 105 by means of bolts 304. On this $\beta$-axis frame 305 is provided a frame 301 as projected therefrom, bearings are provided on this frame 301 to rotatably hold a rotational pin 303, and the sub-arm 401 is fixedly secured to the rotational pin 303. A mechanism for driving the sub-arm about the $\beta$-axis is composed of a $\beta$-axis drive motor 306 mounted on the $\beta$-axis frame 305 and projecting to the side of the $R_3$-axis member 105, and a pinion 307, coupling gears 309 and 310, a worm gear 311, a worm shaft 312, a worm wheel 313, a speed reduction gear and a drive gear 302, all provided within the $\beta$-axis frame 305. When the $\beta$-axis drive motor 306 is actuated, the pinion 307 of the $\beta$-axis drive motor 306 drives the worm shaft 312 into rotation via the coupling gears 309 and 310, and since the worm gear 311 on the worm shaft 312 intermeshes with the worm wheel 313 and the speed reduction gear 314 provided on the same shaft as the worm wheel 313 intermeshes with the drive gear 302 provided on the rotational pin 303, the torque of the motor 306 is transmitted to the rotational pin 303. As shown in FIG. 12, detection of the amount of vertical swing is achieved by the fact that a pinion 315b fixed on an encoder 316 intermeshes with an encoder gear 315a provided on the worm shaft 312 and thereby the encoder 316 is rotated. The operation of the β-axis member is to prevent the change of the attitude of the sub-arm 401 relative to the header plate 3 which will be caused by the above-described operation of the φ-axis member. As shown in FIG. 13, in the case where the sub-arm 401 cannot swing vertically about the β-axis, while the sub-arm 401 is parallel to the header plate 3 in the horizontal state of the R-axis member 101, as the angle φ changes in the clockwise direction as a result of the vertical swing, the attitude of the sub-arm 401 also changes; and eventually if the R-axis member 101 takes the vertical state, the sub-arm 401 also become perpendicular to the header plate 3. Therefore, if the sub-arm 401 can swing vertically about the β-axis so as to compensate for the variation of the angle φ, then the sub-arm 401 can be always maintained in parallel to the header plate 3.

Figure 14:
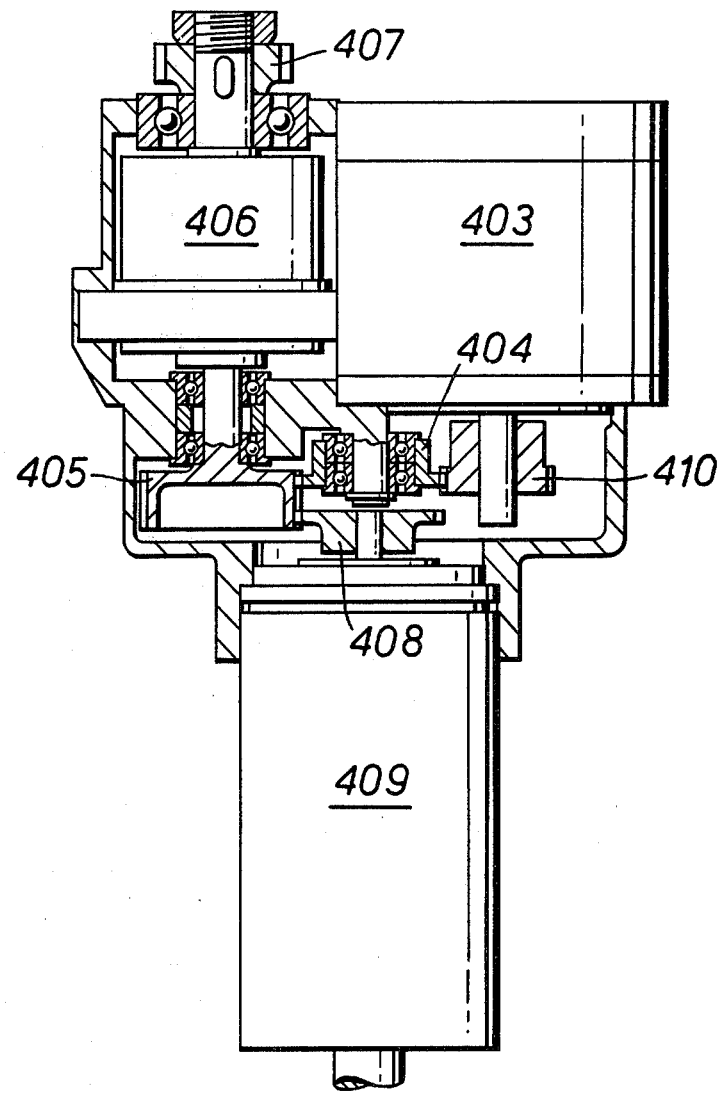
FIG. 14 is a cross-section view showing a rotational drive section of a sub-arm in an enlarged scale.
Figure 15:
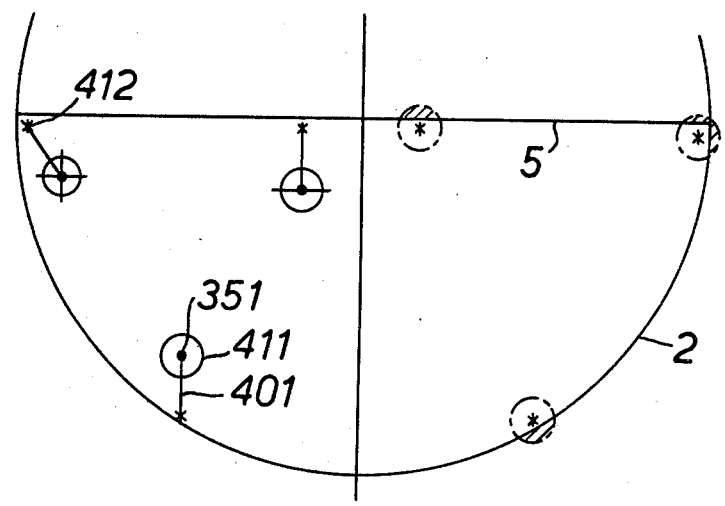
FIG. 15 is a diagrammatic view for explaining a scope of scanning by the sub-arm.
Figure 16:
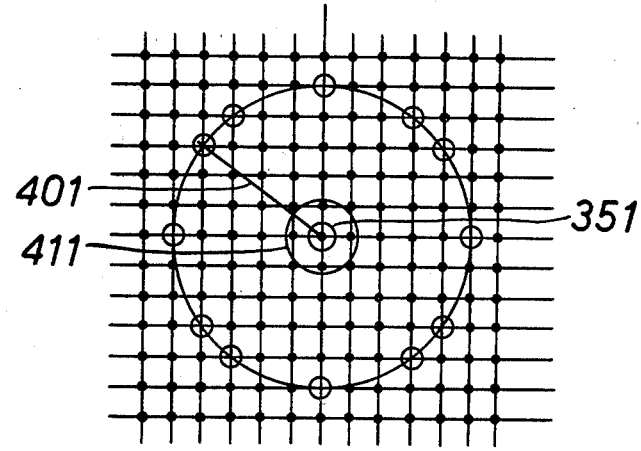
FIG. 16 is a diagrammatic view for explaining scanning points by the sub-arm.

Next, with regard to the rotation about the α-axis member, that is, rotation of the sub-arm 401 about clamp shaft 351, as shown in FIG. 11, a gear 402 is provided on the sub-arm 401 which is supported from clamp shaft 351 via bearings (not shown). A drive section for this α-axis member is composed of an α-axis drive motor 403, a pinion 410, an idler gear 404, a speed reduction gear 405, a reduction gear box 406 and a drive gear 407, as shown in FIG. 14. Detection of the amount of rotation is effected by rotating an encoder 409 via a detection gear 408 which in turn intermeshes with the speed reduction gear 405. The rotational operation of the sub-arm 401 is carried out in such manner that a torque of the α-axis drive motor 403 is transmitted to the gear 402 through the path from pinion 410 to idler gear 404 to speed reduction gear 405 to reduction gear box 406 to drive gear 407. In this way, by rotating the sub-arm 401, scanning can be achieved over the entire region even up to the corner of the water chamber 2 or the vicinity of the partition wall 5, and nevertheless the scanning would not be interfered with by the wall of the water chamber 2 and the partition wall 5. This capability of scanning is illustrated in FIG. 15. In this figure, a small circle 411 conceptually represents the entire configuration of the α-axis drive section, reference numeral 412 designates a scanning point, and small circles depicted by double dot chain lines represent the positioning of the α-axis drive section in the case where the sub-arm 401 is not provided, the hatched area representing the state of interference. It is to be noted that by selecting the length of the sub-arm 401 equal to either 5-fold or its multiple or 13-fold or its multiple of the pitch of the tube array (in the case of forming a square array along the scanning surface), the number of the heat transfer tube positions which can be scanned when the sub-arm 401 is rotated, is increased. This is illustrated in FIG. 16. In this figure, the respective cross-points represent the positions of the heat transfer tubes, and in this case the length of the sub-arm 401 is selected equal to 5-fold of the pitch of the tube array, so that 12 cross-points along a circle can be scanned by rotating the sub-arm 401.

Now description will be made of the C-axis member, that is, the clamp shaft 351 which is provided at the portion which is a tip end portion of the main arm 101 and is also a base end portion of the sub-arm 401. The clamp shaft 351 adapted to be clamped in a thin tube hole 7 of the header plate 3, is pivotably and vertically supported from the sub-arm 401, and it is vertically movable coaxially with the α-axis. A clamp mechanism at the tip end portion of the clamp shaft 351 is constructed in such manner that the tip end portion of the clamp shaft 351 is tapered so as to be thinned towards the tip end, 4-division claws 342 are provided under the tapered portion, and the outer circumference of the claws 352 is held by an O-ring 353, as shown in detail in FIG. 17. At the other end of the clamp shaft 351 is integrally provided a clamp piston 354. The clamp shaft 351 is assembled inside of an elevator shaft 359, and the clamp piston 354 is disposed within a clamp cylinder 358 formed inside of the elevator shaft 359. The outer circumference of the clamp cylinder 358 forms an elevator piston 361, which is disposed within an elevator cylinder 360. Feed of air into the clamp cylinder 358 is effected from a clamp air feed hole 364 in an air feed block 355 provided at the lower end portion of the clamp shaft 351, through a central bore in the clamp shaft 351 and via a clamp air hole 356 penetrated through the clamp piston 354, and release of the clamp action is effected through an air feed pipe 357 which extends from an unclamp air feed hole 365 in the air feed block 355 through the inside of the elevator cylinder 360 and communicates with the clamp cylinder 358. Moreover, for the purpose of elevation and lowering of the elevator shaft 359, an elevation air hole 362 is provided at the bottom portion of the elevator cylinder 360 and a lowering air hole 363 is provided at the top portion of the elevator cylinder 360. In addition, as a position detector, a fiber head 367 is provided at the tip end of the clamp shaft 351, which fiber head is optically coupled through a fiber bundle 366 to an ITV camera 368 equipped with a scale plate (See FIG. 18), which is in turn connected to a TV monitor 369 (See FIG. 1). Accordingly, observation of the thin tube hole 7 as well as positioning of the clamp shaft 351 can be achieved easily.

Figure 17:
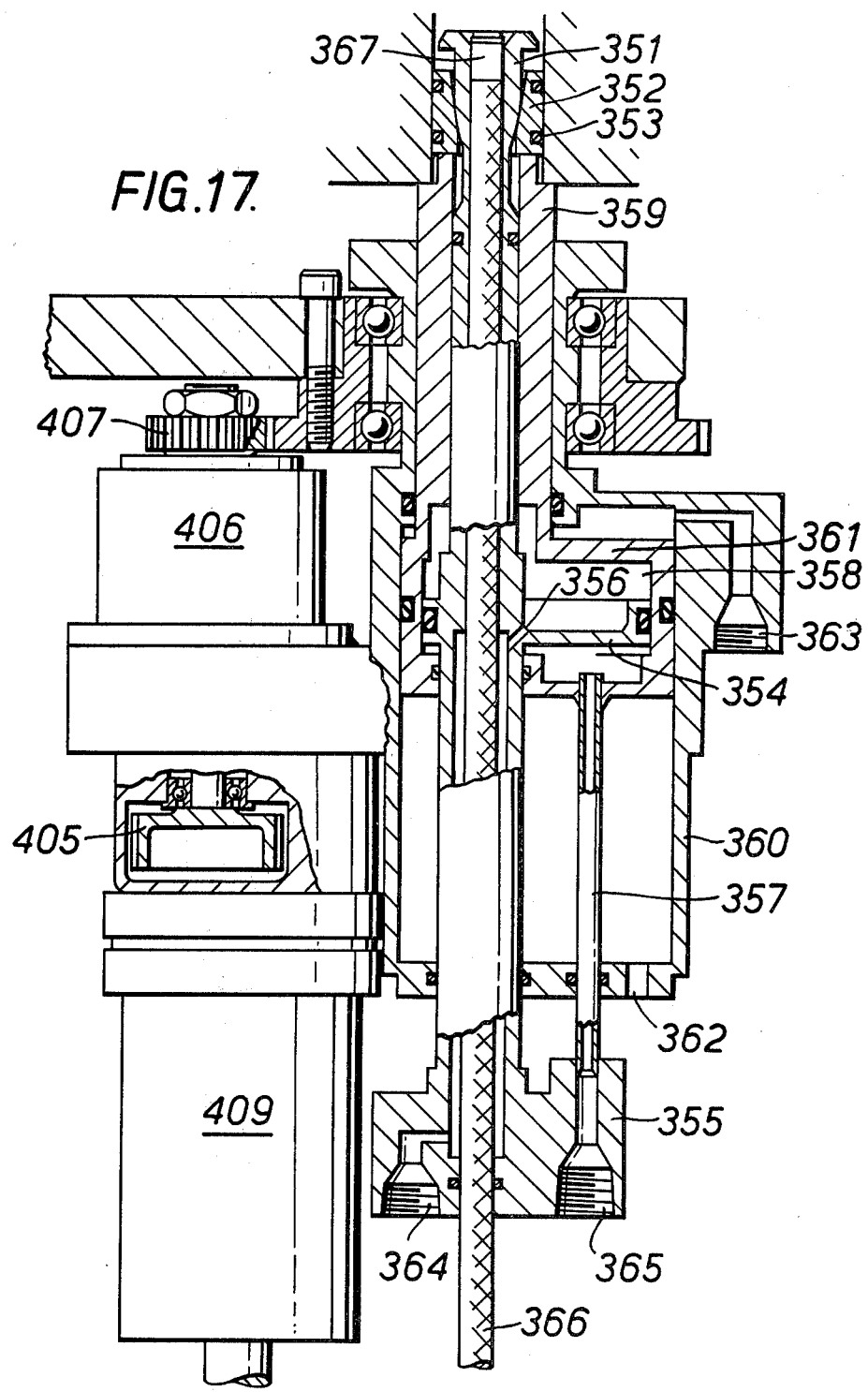
FIG. 17 is an extracted and enlarged cross-section view showing a clamp shaft (C-axis member)

The clamping operation of the clamp shaft 351 is effected after the clamp shaft 351 has been brought to a position right under the thin tube hole 7 through the scanning with respect to the R-axis, θ-axis and φ-axis, respectively. FIG. 17 shows the state where clamping has been completed. At first, compressed air is fed from an air feed apparatus not shown through the elevation air hole 362 into the elevator cylinder 360, so that the elevator piston 361 rises, and the elevator shaft 359 and the clamp shaft 351 rise jointly and are inserted into the thin tube hole 7. Subsequently, compressed air is fed into the clamp cylinder 358 through the clamp air feed hole 364 and the clamp air hole 356, so that the clamp shaft 351 that is integral with the clamp piston 354 is depressed, and the claws 352 are circumferentially expanded by the tapered portion of the clamp shaft 351 and brought into pressing contact with the tube wall. Accordingly, the clamp shaft 351 is firmly fixed in the thin tube hole 7 by a frictional force. Upon releasing the clamp shaft 351, on the contrary to the operations upon clamping, the clamp shaft 351 that is integral with the clamp piston 354 is raised by feeding compressed air through the unclamp air feed hole 365, so that the claws 352 are contracted by the contracting force of the O-ring 353 and disengaged from the tube wall, and then the elevator piston 361 is lowered by feeding compressed air through the lowering air hole 363, so that the clamp shaft 351 is withdrawn from the thin tube hole 7.

With regard to the operation of the position detector provided at the tip end of the clamp shaft 351, since the ITV camera 368 is coupled via a scale plate 370 to the fiber bundle 366, the lateral displacement as well as vertical distance of the clamp shaft 351 from the thin tube hole 7 can be known by observing the position and size of the image of the thin tube hole 7 on the TV monitor 369. More particularly, with reference to FIGS. 19(a) to 19(e), in the state shown in FIG. 19(a) where the clamp shaft 351 is remote from the header plate 3, an image 374 of the thin tube hole 7 is smaller than a preliminary measured reference image size 373 of the thin tube hole 7, and as the clamp shaft 351 approaches the header plate 3, the image 374 becomes larger as shown in FIG. 19(b). By reading the size of the image 374 on the scale plate 370, one can know the distance from the header plate 3 to the clamp shaft 351. In addition, if the clamp shaft 351 is displaced in the horizontal direction, then the displacement will appear on the TV monitor 369 as shown in FIGS. 19(d) and 19(e), and therefore, the horizontal displacement of the clamp shaft 351 also can be known.

Thus any arbitrary position can be scanned by actuating the above-described R-axis member, $\theta$-axis member, $\phi$-axis member, $\beta$-axis member, $\alpha$-axis member and C-axis member, respectively. However, since a fixed directional error of the support frame 11 serving as a reference surface would influence the scanning plane of the turntable 151, there is provided means for correcting the orientation of the turntable 151 on the support frame 11 so as to be in parallel to the surface of the header plate 3, and thereby the directional error of the support frame 11 is compensated for. For that purpose, rocking mechanisms, that is, a $\kappa$-axis member and a $\lambda$-axis member are provided at orthogonal positions above the support frame 11 and under the turntable 151. With regard to the support for the $\kappa$-axis member and $\lambda$-axis member, as shown in FIGS. 20 and 21, a $\kappa$-axis hold block 459 is provided on the support frame 11, the turntable 151 is placed above the $\kappa$-axis hold block 459, the $\kappa$-axis member is supported by the $\kappa$-axis hold block 459 so as to tilt the turntable 151, while the $\lambda$-axis member directed in the direction orthogonal to the $\kappa$-axis member is supported by the support frame 11 so that it may tilt the turntable 151 by tilting the $\kappa$-axis hold block 459.

At first explaining about the $\kappa$-axis member, hold frames 462 and 463 project from the bottom surface of the turntable 151 and rotatably supported by the $\kappa$-axis hold block 459 via pins 460 and 461. In addition, along the direction orthogonal to the pins 460 and 461 there are provided projections on the bottom surface of the turntable 151; links 457a and 457b and links 458a and 458b rotatably supported from these projections via pins 451 and 452, respectively. Between the links 457a and 457b and links 458a and 458b, respectively, are fixedly secured nuts 455 and 456 to form U-shaped links, and $\kappa$-axis ball screws 453 and 454 are threadedly engaged with the nuts 455 and 456, respectively. These $\kappa$-axis ball screws 453 and 454 are threaded inversely to each other, and so, when they are rotated in the same direction, the nuts 455 and 456 will move in the opposite directions to each other and thus will tilt the turntable 151. The drive of the ball screws 453 and 454 is effected by the fact that a drive pinion 468 of a $\kappa$-axis drive motor fixed on the $\kappa$-axis hold back 459 intermeshes via an idler gear 467 with ball screw drive gears 465 and 466 provided at the end portions of the ball screws 453 and 454. A tilting mechanism having a similar construction is also provided for the $\lambda$-axis member which serves to tilt the turntable 151 in the direction orthogonal to that of the $\kappa$-axis member. The $\lambda$-axis member comprises pivot pins 511 and 512 provided on the $\kappa$-axis hold block 459, and these pivot pins are rotatably held by bearings 513 and 514 mounted on the support frame 11. In addition, on the $\kappa$-axis hold block 459, there are provided $\lambda$-axis ball screws 501 and 502 along the direction orthogonal to the line connecting the $\kappa$-axis ball screws 453 and 454, and these ball screws 501 and 502 threadedly engage with nuts 503 and 504 provided on links 505 and 506, respectively. The links 505 and 506 are rotatably held by the $\kappa$-axis hold block 459 via hold pins 507 and 508, respectively. The drive of these $\lambda$-axis ball screws 501 and 502 are effected by the fact that ball screw drive gears 518 and 519 provided at the end portions of the $\lambda$-axis ball screws 501 and 502 intermesh via an idler gear 517 with a drive pinion 516 of a $\lambda$-axis drive motor 516.

Figure 22:
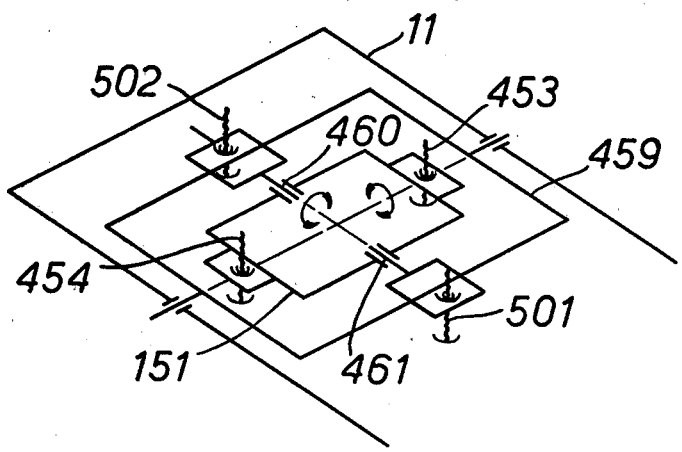
FIGS. 22 and 23 are diagrammatic views for explaining operations of the rocking mechanisms.
Figure 23:
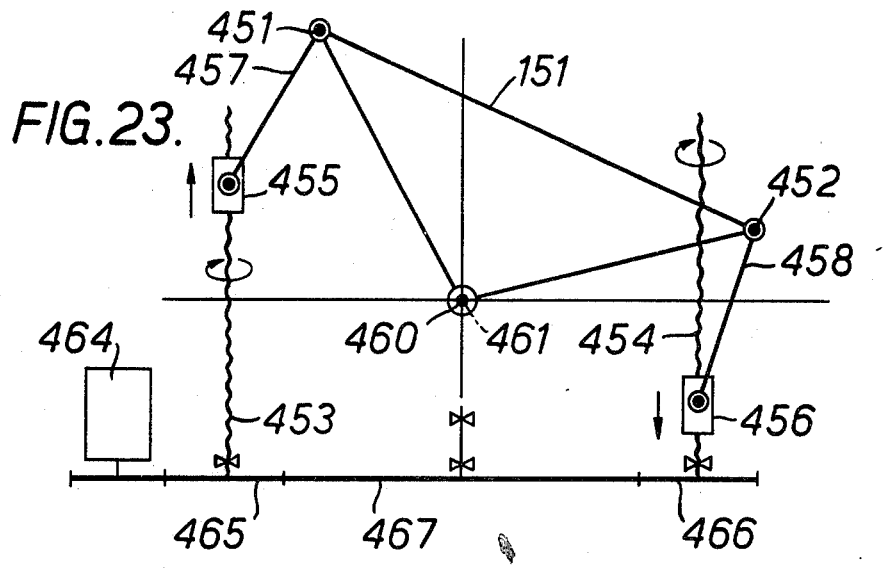

The adjustment of parallelism of the turntable 151 with respect to the surface of the header plate 3 is carried out by means of the $\kappa$-axis member and $\lambda$-axis member in the following manner. As shown in FIGS. 22 and 23, the torque of the $\kappa$-axis drive motor 464 is transmitted from the drive pinion 468 to the idler gear 467, and is further transmitted to the ball screw drive gear 465 and 466 to rotate the ball screws 453 and 454, respectively. At this moment, since the ball screws 453 and 454 are inversely threaded to each other, the nuts 455 and 456 are displaced in the opposite directions by the same amount. Accordingly, the link mechanism consisting of the links 457 and 458, hold pins 451 and 452 and pivot pins 460 and 461, will rotate about the pivot pins 460 and 461, resulting in tilting of the turntable 151. In addition, with regard to tilting about another axis orthogonal to the above-mentioned $\kappa$-axis also, the $\kappa$-axis hold block 459 is tilted as a whole by means of a similar mechanism, and hence, the turntable 151 will be tilted.

Figure 24:
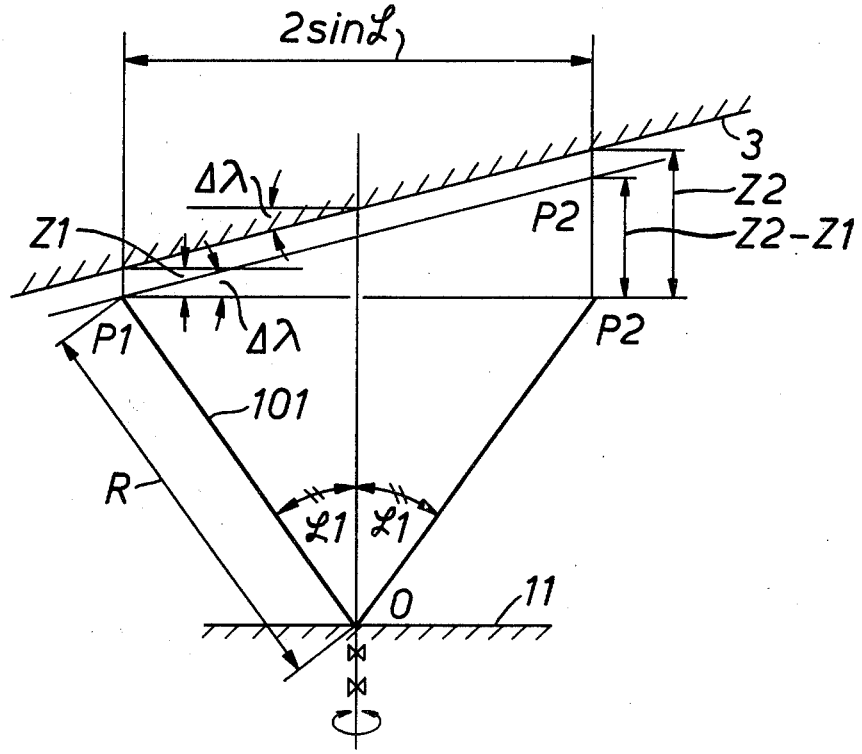
FIG. 24 is a diagrammatic view for explaining adjustment of parallelism by means of the rocking mechanisms.

The constructions and operations of the individual ones of the R-axis member, $\theta$-axis member, $\phi$-axis member, $\beta$-axis member, $\alpha$-axis member, C-axis member, $\kappa$-axis member and $\lambda$-axis member have been described above. In a scanning work to be achieved by making use of these respective members in combination, at first the fixed table 14 and the support frame 11 are fixed within the water chamber 2, and thereafter, in order to make the turntable 151 on the support frame parallel to the header plate 3, adjustment of parallelism is effected by means of the rocking mechanism. In this adjustment, the $\kappa$-axis member and $\lambda$-axis member are used as described above, and the parallelism is detected by means of a fiberscope position detector including a fiber bundle 366 and ending at the tip end portion of the C-axis member, that is, the clamp shaft 351, and the parallelism is realized according to the principle illustrated in FIG. 24. More particularly, with respect to the plane including both $\lambda$-axis ball screws, assuming that an inclination angle $\phi$ is given by $\phi = \phi_1$, the distance between the header plate 3 (the thin tube hole 7) and the fiber head 367 (FIG. 17) at this moment is $Z_1$, and the same distance when the scanning apparatus has been turned by 180° is $Z_2$, then the attitude error $\Delta\lambda$ between the support frame 11 and the header plate 3 is calculated, if it exists, by the following formulae:

$$\Delta Z = Z_2 - Z_1$$

$$\Delta\lambda = \tan^{-1}\frac{Z_2 - Z_1}{2R \sin \phi_1} \text{ (if } Z_1 \neq Z_2)$$

Accordingly, if the κ-axis hold block 459 is tilted about the λ-axis so as to realize $Z_1 = Z_2$, that is, $\Delta Z = 0$, then the κ-axis hold block 459 becomes parallel to the header plate 3. Likewise, by tilting the turntable 151 about the κ-axis, the turntable 151 becomes completely parallel to the header plate 3. Through these operations, the reference surface can be established. Subsequently, by realizing the respective coordinates (R, θ, φ) with the respective axis members on the reference surface, that is, on the turntable 151, the corresponding coordinate position can be scanned while detecting the amounts of actuation of the respective axis members. During this scanning, since a visual monitoring apparatus is used, the thin tube hole 7 can be always observed in the field of the visual monitor before clamping, and hence, some deviation in position can be corrected by means of the tip end tapered portion of the clamp shaft 351. After the scanning has been made in the above-described manner, the clamp shaft 351 of the sub-arm 401 can be clamped in the thin tube hole 7. Thereafter, a desired work is carried out by means of a tool or an inspection device mounted on the sub-arm 401. At this moment, as noted previously, a large number of thin tube holes 7 can be scanned during the rotation of the sub-arm 401 by selecting the length of the sub-arm 401 at an appropriate value. In addition, upon replacement of a tool to be effected as a result of change of the work, the sub-arm 401 can be brought to the vicinity of the manhole by folding the scanning apparatus according to the present invention, and so, the replacement of the tool can be achieved easily.

As described in detail above with reference to its preferred embodiment, by employing the manipulator for working in a heat exchanger according to the present invention, the manipulator can be easily fixed without entering a narrow space in a water chamber of a heat exchanger, and also the error in positioning upon fixing can be corrected, so that a reference surface for scanning can be obtained precisely. In addition, since variables corresponding to the polar coordinates are used for positioning a scanning point, the method of control is simple and the entire apparatus can be made compact and light in weight. Moreover, owing to the provision of the sub-arm, the entire region of the header plate surface can be scanned, and upon carrying out a positioning operation, the distance from the header plate as well as the lateral deviation can be measured by making use of a position detector provided in the clamp shaft. Furthermore, the manipulator can be clamped in the thin tube hole by means of the clamp shaft, and hence the load holding capability can be greatly enhanced. Accordingly, the manipulator is little restricted by the kind of the work, and positioning and correction of a deviation can be also achieved precisely. Besides, various great effects and advantages are obtained such that upon replacement of a tool mounted on a sub-arm, since the sub-arm is brought to a position near to the manhole when the apparatus is folded, the tool can be replaced easily.

What is claimed is:

1. A manipulator for working in a heat exchanger, the heat exchanger including a water chamber delimited by a drum end plate and a header plate on which a large number of heat transfer tubes of a vertical type heat exchanger are arrayed, the manipulator comprising a support frame disposable within said water chamber; a freely extensible and contractible main arm having a first base end portion mounted on said support frame and a tip end portion, said main arm being rotatable about said first base end portion and vertically swingable about a first fulcrum at said first base end portion; a sub-arm having a second base end portion mounted at said tip end portion of said main arm, said sub-arm being rotatable about said second base end portion and vertically swingable about a second fulcrum at said second base end portion, said sub-arm being positionable in parallel to said header plate; a vertically movable clamp shaft insertable into one of said large number of heat transfer tubes, coaxial with the rotational axis of said sub-arm; and a position detector for detecting the position of said clamp shaft for use in positioning said clamp shaft so as to become coaxial with said one of said large number of heat transfer tubes, provided on said clamp shaft.

2. A manipulator as in claim 1, wherein said header plate extends in a horizontal plane and said large number of heat transfer tubes extend in a vertical direction.

3. A manipulator as in claim 1, further comprising means for independently extending, retracting, rotating and pivoting each of said main arm and said clamp shaft.

4. A manipulator for working in a heat exchanger which includes a water chamber delimited by a drum end plate and a header plate on which a plurality of parallel heat transfer tubes of a vertical type heat exchanger are arrayed so as to extend in a first direction, the manipulator comprising:

a support frame disposable within said water chamber;
a main arm extensible and contractable in a radial direction, having a first base end and a tip end opposite said first base end;
first means for rotatably mounting said main arm to said frame at said first base end so as to be rotatable about a first axis generally stationary with respect to said frame;
said first means including second means for pivotally mounting said main arm at said first base end to said first means so as to be pivotable about a second axis which rotates about said first axis with rotation of said main arm about said first axis;
a sub-arm having a second base end;
third means for pivotally mounting said sub-arm at said second base end to said main arm at said tip end so that said sub-arm is pivotable about a third axis fixed with respect to said tip end;
said third means including fourth means for rotatably mounting said sub-arm at said second base end to said third means so as to be rotatable about a fourth axis which pivots about said third axis with pivotal movement of said sub-arm about said third axis, said sub-arm being positionable in parallel with the header plate;
a clamp shaft insertable into each of the plurality of heat transfer tubes, said clamp shaft extending coaxially with said fourth axis and being movable therealong relative to said tip end; and means, disposed on said clamp shaft, for detecting the position of said clamp shaft in positioning said clamp shaft so as to become coaxial with one of said plurality of heat transfer tubes.

5. A manipulator as in claim 4, wherein the first direction is perpendicular to the header plate.

6. A manipulator as in claim 4, further comprising means for adjusting the orientation of said first axis with respect to said frame.

7. A manipulator as in claim 4, further comprising means for independently extending, retracting, rotating and pivoting each of said main arm and said clamp shaft.

* * * * *